United States Patent [19]

Stinson

[11] 4,024,776
[45] May 24, 1977

[54] VARIABLE RATIO PLANETARY ASSEMBLY

[75] Inventor: Robert A. Stinson, Aurora, Ill.

[73] Assignee: Caterpillar Tractor Co., Peoria, Ill.

[22] Filed: Sept. 17, 1975

[21] Appl. No.: 614,046

[52] U.S. Cl. .................................. 74/689; 74/687; 74/740; 74/789

[51] Int. Cl.$^2$ ................ F16H 37/00; F16H 47/04

[58] Field of Search ........... 74/789, 770, 793, 801, 74/797, 740, 805, 665 P, 665 Q, 674, 681, 687–689, 665 F, 665 G, 665 S, 640, 665 R

[56] References Cited

UNITED STATES PATENTS

| | | | |
|---|---|---|---|
| 2,582,620 | 1/1952 | Colucci | 74/789 |
| 3,374,691 | 3/1968 | Schottel | 74/793 |

*Primary Examiner*—Samuel Scott
*Assistant Examiner*—Lance W. Chandler

*Attorney, Agent, or Firm*—Phillips, Moore, Weissenberger, Lempio & Majestic

[57] ABSTRACT

A variable ratio planetary assembly is comprised of a pair of planetary gear systems, each driven by an input shaft, and an output assembly rotatably mounted relative to the input shaft. The first planetary system has a carrier fixed relative to a support and drives a first drive gear means rotatably mounted on the output assembly. The second planetary system, sized differently than the first, drives a second drive gear means similarly mounted. Holding the output assembly fixed, allows portions of the first and the second drive gear means to rotate at a first peripheral speed ratio relative one to the other. Interconnecting the aforesaid portions defines a second peripheral speed ratio and rotates the output assembly relative to the input shaft.

9 Claims, 4 Drawing Figures

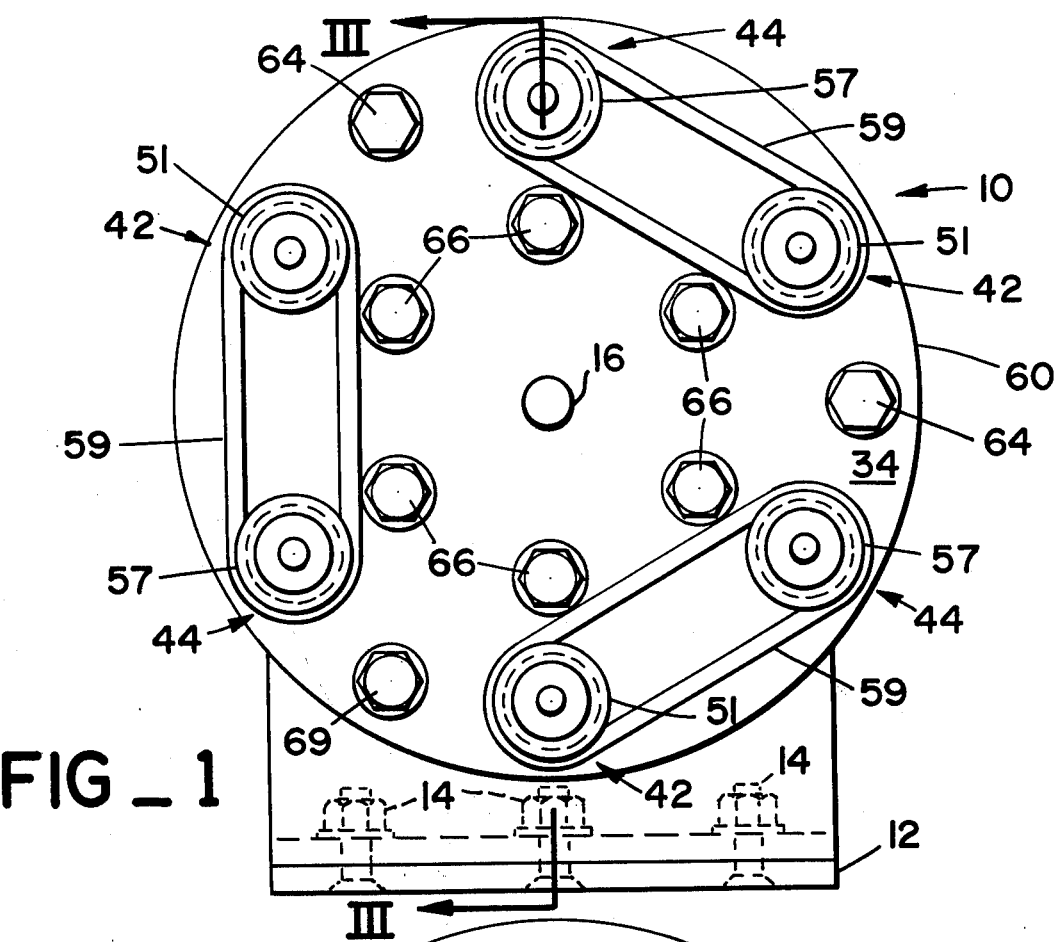
FIG_1
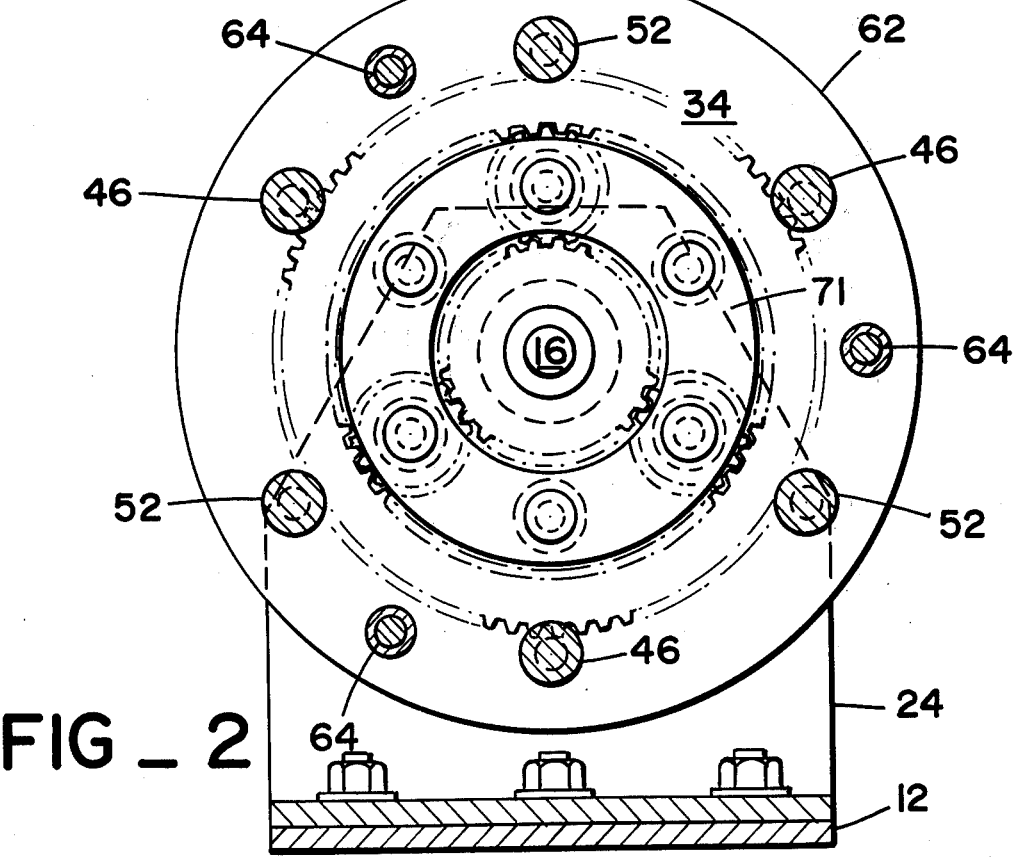
FIG_2

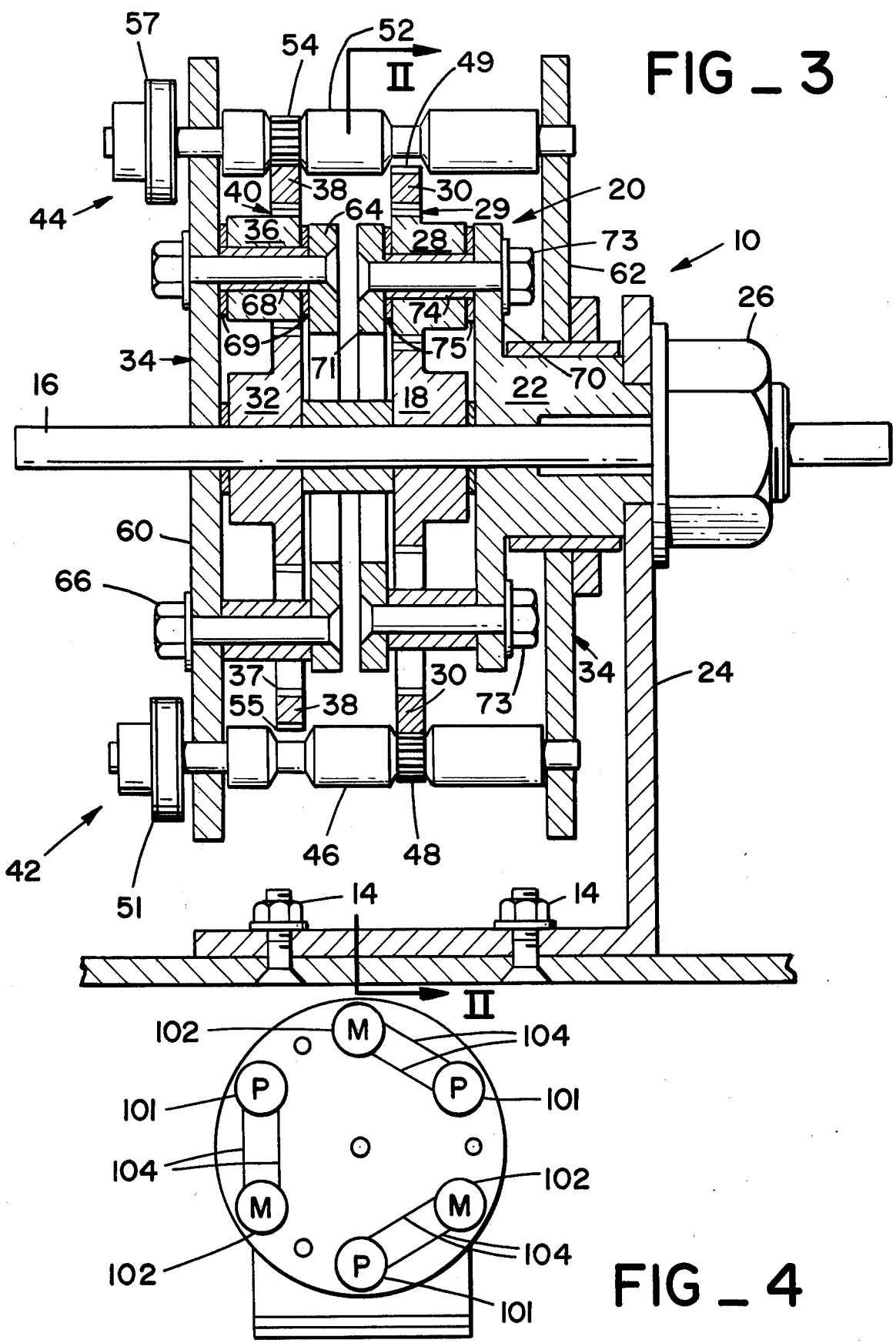

VARIABLE RATIO PLANETARY ASSEMBLY

BACKGROUND OF THE INVENTION

Various apparatus have been developed to provide a speed reduction for an engine. An assembly of gear trains, which may incorporate clutches to engage differing gear ratios, is one of the most common; however, such an assembly suffers from a drawback of providing only a finite number of reduction ratios. A planetary gear system suffers from the same drawback. Both such gear systems are hampered by the possibility of premature failure of one of the gear members. An assembly of pulleys and belts may also be used for varying the torque output produced by an input shaft; however, breakage of a belt, which also results in failure of the system, motivates against the use of a pure belt and pulley arrangement. Belts and pulleys, however, allow for a certain amount of slippage in an overload condition. Accordingly, an apparatus comprised of a gear arrangement and a pulley-belt arrangement provides a speed reducing capability in the transmission of torque incorporating the desirable features of the straight gear arrangement and the straight pulley-belt arrangement. A redundant pulley-belt arrangement so that failure of one belt does not result in failure of the system provides an even more reliable and longer lived system.

SUMMARY OF THE INVENTION

It is an object of this invention to provide a variable ratio planetary assembly for transmitting torque from an engine to a drive system.

It is also an object of this invention to provide a variable ratio planetary assembly which, while fulfilling the above object, operates without premature failures.

It is a still further object of this invention to provide a variable ratio planetary assembly which, while fulfilling the above objects, provides output through a plurality of belt coupling means so that failure of one belt does not result in loss of use of the planetary assembly.

It is still a further object of this invention to provide a variable ratio planetary assembly which, while fulfilling the above objects, provides a variable reduction ratio through variable diameter pulleys, or alternatively a hydraulic pump-motor system.

Broadly stated, the invention is a variable ratio planetary assembly mounted on a support means, and driven by an input shaft. The input shaft rotatably mounted in the support means drives a first planetary gear arrangement and a second planetary gear arrangement. An output assembly is rotatably mounted relative to the input shaft and has mounted thereon a first drive gear means driven by the first planetary gear arrangement and a second drive gear means driven by the second planetary gear arrangement. With the output assembly held in position relative to the support means, a portion of the first drive gear means rotates at a speed different from a portion of the second drive gear means, such speed difference defined as a first peripheral speed ratio. Means interconnecting the first and second drive gear means provide the portions are made to turn relative one to the other at a second peripheral speed ratio and the output assembly is rotated relative to the support means by the input shaft.

BRIEF DESCRIPTION OF THE DRAWINGS

These and other objects of the invention will become apparent from a study of the following specifications and drawings, in which:

FIG. 1 shows a front view of the variable ratio planetary assembly which is the subject of this invention;

FIG. 2 shows a section view of the same variable ratio planetary assembly, illustrated in FIG. 1, taken at line II—II of FIG. 3.

FIG. 3 is a cross-section of the variable ratio planetary assembly shown in FIG. 1 taken at line III—III;

FIG. 4 is an alternate embodiment of the variable ratio planetary assembly utilizing a plurality of pump motor arrangements.

DESCRIPTION OF THE PREFERRED EMBODIMENTS

Shown in FIG. 1 is a variable ratio planetary assembly 10 according to this invention mounted on a base plate 12 by means of a plurality of fastening bolts 14. Referring to FIG. 3, the variable ratio planetary assembly 10 is shown in cross-section. An input shaft 16 has mounted thereon a first input gear member 18 of first planetary gear arrangement 20. Planet carrier 22 of first planetary gear arrangement 20 is fixed to support means 24 by nut 26 to prevent rotation thereof in relation to shaft 16. Planet carrier 22 has rotatingly mounted thereon a plurality of planet gears 28 intermeshing with first input gear member 18. First planetary gear arrangement 20 further comprises a first ring gear 30 having internal teeth 29 intermeshing with the plurality of planet gears 28.

Input shaft 16, in addition to having first input gear member 18 mounted thereon, has second input gear member 32 of second planetary gear arrangement 40 mounted thereon, second input gear member 32 having a different number of teeth than first input gear 18 and shown here having a larger number of teeth. Output assembly 34 has mounted thereon a plurality of second planet gears 36 intermeshing with second input gear member 32. Output assembly 34 is free to rotate about shaft 16. Second ring gear 38 makes up the third member of second planetary gear arrangement 40 having internal teeth 37 in intermeshing relation with the plurality of second planet gears 36.

Means are provided for interconnecting first ring gear 30, second ring gear 38, and output assembly 34. Such means comprise a plurality of first drive gear means 42 rotatingly mounted on output assembly 34 and drivingly connected to first ring gear 30, and a plurality of second drive gear means 44 also rotatingly mounted on output assembly 34 and drivingly connected to second ring gear 38. Each of the first drive gear means 42 comprises a first shaft 46 rotatingly mounted in output assembly 34, the first shaft having mounted thereon or integrally formed therewith a first pinion gear 48. First ring gear 30 further comprises an annular output ring gear having external teeth 49 which intermesh with first pinion gears 48. Each first shaft 46 has drivingly mounted at one end and exterior of output assembly 34 a pulley 51. Second drive gear means 44 is of a similar construction, each second drive gear means having a second shaft 52, with a second pinion gear 54 either integrally formed therewith or mounted thereon. Second ring gear 38 is also an annular ring gear having external teeth 55 intermeshing with second pinion gears 54. Second shaft 52 has mounted at one end and exterior of output assembly 34 a pulley 57. Rotation of input shaft 16, while output assembly 34 is held fixed relative to input shaft 16, results in pulleys 51 rotating at a different peripheral speed than pulleys 57, thus defining a first peripheral speed ratio. Each pulleys 57 has associated therewith a mating pulley 51 (see FIG. 1), interconnection of pulley 57 with an associated pulley 51 by a drive belt 59, allows the associated pair of pulleys 57 and 51 to rotate at a second peripheral speed ratio relative to each other, while output assembly 34 rotates relative to input shaft 16. In the preferred embodiment pulleys 57 and pulleys 51 are of equal diameter.

Output assembly 34 is comprised of front plate member 60 and rear plate member 62 (FIG. 3). Front plate member 60 is affixed to rear plate member 62 by through-bolts 64 (FIG. 1 and FIG. 2) insuring rotation of front plate member 60 and rear plate member 62 as a unit. Output assembly 34 has affixed thereto by a plurality of bolts 66 a planet carrier member 64 (FIG. 3). Planet carrier member 64 is interposed between front plate member 60 and rear plate member 62. The plurality of bolts 66 serving as shaft members for second planet gears 36. As shown in the preferred embodiment, the number of second planet gears 36 may be less than the plurality of bolts 66, the second planet gears 36, mounted on bearing means 68 and free to rotate thereon, being separated from front plate member 60 and planet carrier member 64 by spacers 69.

Planet carrier 22 is comprised of member 70 fixed to support 24 by nut 26 as described above, and plate 71. Plate 71 is affixed to member 70 by a plurality of bolts 73. Bolts 73 act as shaft members for planet gears 28. Planet gears 28 may be of lesser number than the plurality of bolts 73. Planet gears 28 rotate on bearing means 74 and are separated from plate 71 and member 70 by spacers 75.

In operation an input torque is provided to shaft 16 to rotate first input gear member 18 and second input gear member 32. First input gear member 18 rotates first planet gears 28 which in turn drive first ring gear 30. First ring gear 30, in intermeshing relationship with first pinion gears 48 rotates pulleys 51 mounted on shafts 46. It is to be emphasized that carrier 22 is fixed to support member 24 thereby the reaction member of first planetary gear arrangement 20 is fixed, with output provided to first ring gear 30. Second input gear member 32 rotates in the same direction as first input gear member 18 and drives the plurality of second planet gears 36. Second planet gears 36, mounted on output assembly 34, which itself is free to rotate, may rotate about shaft 16 in an epicyclic manner. Concurrently, second planet gears 36, being in intermeshing relationship with second ring gear 38, drive second ring gear 38 which in turn drives second pinion gears 54, second pinion gears 54 driving pulleys 57. Interconnecting each pulley 57 with an associated pulley 51 by a drive belt causes output carrier 34 to rotate in a fixed relation to input shaft 16. For example, if pulleys 51 rotate at 1 rpm and pulleys 57 rotate at 1.14 rpm without interconnecting drive belts 59 and with output assembly 34 stopped; by mounting drive belts 59 output assembly 34 will rotate proportionally to the input shaft rotation about the center line of the axis of shaft 16. In the embodiment illustrated, this ratio is about 33 to 1 if both pulleys 57 and 51 have the same diameter.

By changing the effective diameters of the pulleys the output of the pulleys will be changed proportionally. Changing of the effective diameter of the pulleys may be done by replacement of pulleys 57 and 51 or more advantageously, by replacing fixed diameter pulleys 57 and 51 with variable diameter pulleys, the diameter of pulleys 57 being varied inversely to the diameter of pulleys 51, the sum of the diameters remaining constant, in order to utilize the same belt. However, it is to be understood that pulleys 57 may be varied independently of pulleys 51 by the addition of a belt tensioning device to take up slack.

An alternate embodiment is shown in FIG. 4 wherein each pulley 51 is replaced by a fluid pump 101 rigidly affixed to output assembly 34 and a pump drive shaft drivingly connecting fluid pump 101 to first shaft 46. Each pulley 57 is replaced by a fluid motor 102 rigidly affixed to output assembly 34 and a motor drive shaft drivingly connecting fluid motor 102 to second shaft 52. Each fluid pump 101 is interconnected with a mating fluid motor 102 by conduits 104, such conduits being well-known in the art are not herein further described, so that with a supply of fluid provided each pump-motor arrangement each fluid pump 101 drives its mating fluid motor 102. The hydraulic loop thus formed is closed and need not include a reservoir. In order to accomplish a variable ratio, fluid pumps 102 may be of the variable displacement type. Use of such hydraulic interconnection means utilizes the flexibility inherent in such hydraulic systems. Further, in such a hydraulic system the fluid motor is running at or near operating speed when a load is placed on the output assembly thus overcoming the high torque requirements of a conventional pump-motor system when starting the motor from a zero speed. Finally, failure of any one of the plurality of pump-motor systems hereinbefore described does not result in system failure because of the redundancy of the system. Operation of the alternate embodiment generally follows that of the preferred embodiment.

Although the described embodiments have been set forth with a degree of particularity, modifications and changes may be made therein without departing from the spirit and scope of the invention.

What is claimed is:

1. A variable ratio planetary assembly comprising:
   support means;
   an input shaft rotatably mounted on said support means;
   an output assembly rotatably mounted relative to said input shaft;
   first drive gear means rotatably mounted on said output assembly;
   second drive gear means rotatably mounted on said output assembly;
   a first planetary gear assembly drivingly connected to said input shaft and driving said first drive gear means;
   a second planetary gear assembly drivingly connected to said input shaft and driving said second drive gear means, the first and second planetary gear arrangement being sized and configured so that, with the output assembly held in position relative to the support means the first drive gear means is rotated to define a peripheral speed of a portion thereof different from the peripheral speed of a portion of the second drive gear means, said peripheral speeds of said portions defining a first peripheral speed ratio; and, means for interconnecting said portions of the first and second drive gear means so that said portions are made to turn relative one to the other at a second peripheral speed ratio, wherein the output assembly is rotated relative to the support means by rotation of the input shaft.

2. The apparatus set forth in claim 1 wherein the first planetary gear assembly comprises a first input gear member driven by the input shaft, a first planet carrier fixed to the support means to prevent rotation of said first planet carrier relative to said input shaft, a plurality of first planet gears rotatably mounted on said first planet carrier and in intermeshing relationship with said first input gear member, and a first ring gear in intermeshing relation with said plurality of first planet gears and driving the first drive gear means;

and further wherein the second planetary gear assembly comprises a second input gear member driven by said input shaft, a second planet carrier rotatably mounted about said input shaft and connected to the output assembly to be rotatable therewith, a plurality of second planet gears rotatably mounted on said second planet carrier and in intermeshing relation with said second input gear member, and a second ring gear in intermeshing relation with said plurality of second planet gears, and driving the second drive gear means.

3. The apparatus as set forth in claim 2 wherein the first ring gear comprises an annular ring gear having external teeth for driving the first drive gear means; and further wherein the second ring gear comprises an annular ring gear having external teeth for driving the second drive gear means.

4. The apparatus set forth in claim 3 wherein the first drive gear means further comprises a first shaft rotatably mounted on the output assembly, a first pinion gear drivingly mounted on said first shaft in an intermeshing relation with the external teeth of the first ring gear, and wherein the portion of said first drive gear means rotatable at a peripheral speed different from the peripheral speed of the portion of the second drive gear means comprises first pulley means drivingly mounted on said first shaft; and further wherein the second drive gear means comprises a second shaft rotatably mounted on said output assembly, a second pinion gear drivingly mounted on said second shaft and in intermeshing relationship with the external teeth of the second ring gear, and further wherein the portion of the second drive gear means rotatable at a peripheral speed different from said first pulley means comprises a second pulley means drivingly mounted on said second shaft.

5. The apparatus as set forth in claim 4 wherein the means interconnecting said first pulley means with said second pulley means comprises belt means interconnecting said first and second pulley means so that said first pulley means and said second pulley means are made to travel relative to each other at said second peripheral speed ratio.

6. The apparatus, as set forth in claim 5, wherein said first pulley means comprises a first variable diameter pulley and further wherein said second pulley means comprises a second variable diameter pulley.

7. The apparatus set forth in claim 3 wherein the first drive gear means further comprises a first shaft rotatably mounted on the output assembly, a first pinion gear drivingly mounted on said first shaft in an intermeshing relation with the external teeth of the first ring gear and a fluid pump mounted on said output assembly, and wherein the portion of said first drive gear means rotatable at a peripheral speed different from the peripheral speed of the portion of the second drive gear means comprises a pump drive shaft drivingly connecting said fluid pump to said first shaft, further wherein the second drive gear means comprises a second shaft rotatably mounted on said output assembly, a second pinion gear drivingly mounted on said second shaft and in intermeshing relationship with the external teeth of the second ring gear and a fluid motor mounted on said output assembly and wherein the portion of the second drive gear means rotatable at a peripheral speed different from said pump drive shaft comprises a motor drive shaft drivingly connecting said fluid motor to said second shaft.

8. The apparatus as set forth in claim 7 wherein the means interconnecting said portions of the first and second drive gear means comprises conduit means for interconnecting said fluid pump with said fluid motor and a supply of fluid so that said pump drive shaft and said motor drive shaft are made to travel relative to each other at the second peripheral speed ratio.

9. The apparatus as set forth in claim 8 wherein said fluid pump means comprises a variable displacement fluid pump means.

* * * * *